United States Patent
Zhang

(10) Patent No.: US 8,902,323 B2
(45) Date of Patent: Dec. 2, 2014

(54) FACE RECOGNITION SYSTEM AND METHOD FOR TAKING GROUP PHOTO

(75) Inventor: Pan Zhang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 68 days.

(21) Appl. No.: 13/568,149

(22) Filed: Aug. 7, 2012

(65) Prior Publication Data

US 2013/0169836 A1    Jul. 4, 2013

(30) Foreign Application Priority Data

Dec. 28, 2011  (CN) .......................... 2011 1 0448837

(51) Int. Cl.
*H04N 5/228*      (2006.01)

(52) U.S. Cl.
USPC ...................................................... 348/222.1

(58) Field of Classification Search
CPC .............. H04N 5/232; H04N 5/23219; H04N 5/23212; H04N 5/23293; H04N 5/235
USPC ............... 348/222.1, 345, 346, 362
See application file for complete search history.

(56) References Cited

U.S. PATENT DOCUMENTS

| | | | |
|---|---|---|---|
| 2010/0014721 A1* | 1/2010 | Steinberg et al. | 382/118 |
| 2011/0050939 A1* | 3/2011 | Tsurumi et al. | 348/222.1 |
| 2011/0063465 A1* | 3/2011 | Nanu et al. | 348/222.1 |
| 2011/0158547 A1* | 6/2011 | Petrescu et al. | 382/224 |

* cited by examiner

*Primary Examiner* — Timothy J Henn
(74) *Attorney, Agent, or Firm* — Novak Druce Connolly Bove + Quigg LLP

(57) ABSTRACT

A face recognition method recognizes complete faces in a preview image of a group photo taken by an image capturing device, divides the preview image into default blocks if the number of the complete faces is no more than a predetermined number, and adjusts the default blocks into adjusted blocks, wherein the adjusted blocks comprising complete face blocks and non-complete face blocks, wherein each of the complete face blocks contains only one complete face while each of the non-complete face blocks does not contain any complete face, and one of the most adjacent complete face contains one of the most adjacent complete faces. The method analyzes the adjusted blocks to obtain target blocks from the non-complete face blocks which is most adjacent to any one of the complete face blocks and recognizes facial features in each of the target blocks and obtain non-complete face blocks.

8 Claims, 7 Drawing Sheets

FACE RECOGNITION SYSTEM AND METHOD FOR TAKING GROUP PHOTO

BACKGROUND

1. Technical Field

The present disclosure relates to face recognition technologies and, particularly, to a face recognition system and a face recognition method used for taking a group photo.

2. Description of Related Art

It is difficult to take a good group photo, especially when the group is too big to make sure that all people's faces in the group are completely taken. Therefore, it is desirable to provide a face recognition system and a face recognition method, which can overcome the above-mentioned shortcomings.

DETAILED DESCRIPTION

Figure 1:
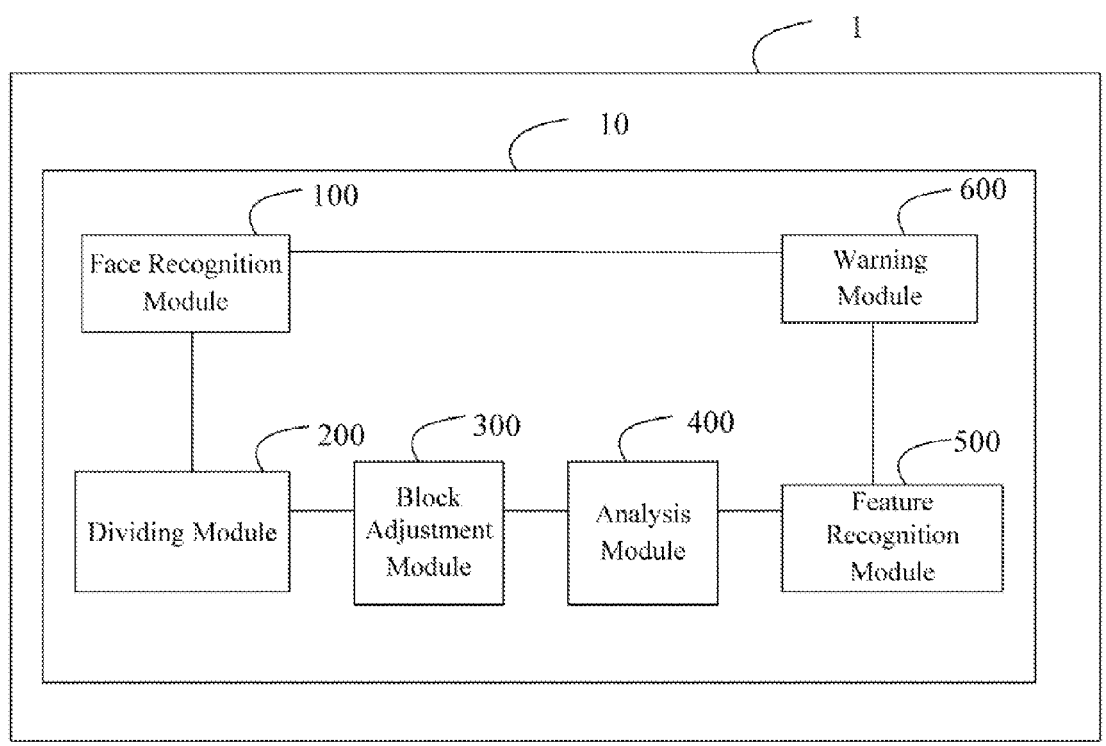
FIG. 1 is a functional block diagram of a face recognition system, according to an embodiment.

Embodiments of the disclosure will be described in detail, with reference to the accompanying drawings.

Referring to FIG. 1 and FIGS. 2A to 2E, a face recognition system 10 for taking group photos, according to an embodiment, includes a face recognition module 100, a dividing module 200, a block adjustment module 300, an analysis module 400, a feature recognition module 500, and a warning module 600. The face recognition system 10 can be implemented on an image capturing device 1 such as a digital still camera for taking the group photos. The image capturing device 1 captures and displays preview images of the group photos. Each of the preview images includes a set of pixels, each of which can be represented by a byte.

The face recognition module 100 is configured to read and obtain one preview image (see FIG. 2A) and recognize complete faces, if any, in the preview image. Only when all facial features of a face are found, the face can be recognized as a complete face by the face recognition module 100. Otherwise, if not all the facial features of the face are captured in the preview image, the face cannot be recognized as a complete face. In addition, the face recognition module 100 can drive the image capturing device 1 to highlight complete faces, if any, in the preview image. In this embodiment, the preview image includes three complete faces 11 (see FIG. 2B).

The dividing module 200 is connected to the face recognition module 100 and configured to divide the preview image into a number of default blocks 12 (see FIG. 2C) when the number of the complete faces 11 is more than or equal to a predetermined number. The default blocks 12 can be identical to each other and a shape and a size there are set by default. Users can set the predetermined number and in this embodiment the predetermined number is three. The dividing module 200 also activates the block adjustment module 300, the analysis module 400, and the feature recognition module 500 when the number of the complete faces 11 is more than or equal to the predetermined number. In practice, the dividing module 200 divides the set of pixels of the preview image into a number of sub-sets of pixels. Each sub-set of pixels is regarded as one default block 12. The dividing module 200 can drive the image capturing device 1 to display a number of indicating lines 13 to indicate boundaries of the default blocks 12.

The block adjustment module 300 is connected to the dividing module 200 and configured to adjust the default blocks 12 into a number of adjusted blocks 14. The adjusted blocks 14 are identical to each other and classified into a number of complete face blocks 14c and a number of non-complete face blocks 14n (see FIG. 2D). Each of the complete face blocks 14c contains only one complete face 11 while each of the non-complete face blocks 14n does not contain any complete face 11. One of the most adjacent complete face blocks 14c contains one of the most adjacent complete faces 11. In practice, the block adjustment module 300 can obtain distance between the complete faces 11 based upon recognition results of the face recognition module 100 and thus determine a size, a shape, and positions of the adjusted blocks 14. The block adjustment module 300 can drive the image capturing device 1 to renew the indicating lines 13 to indicate the adjusted blocks 14. The indicating lines 13 can be updated according to the adjusted blocks 14.

The analysis module 400 is connected to the block adjustment module 300 and configured to analyze the adjusted blocks 14 to obtain a number of target blocks 14t from the non-complete face blocks 14n, which are most adjacent to the complete face blocks 14c.

Figure 2A:
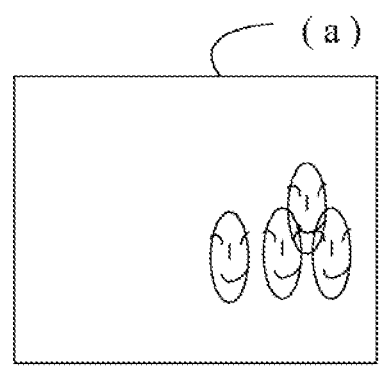
FIG. 2A is a first schematic view showing operations of the face recognition system.
Figure 2B:
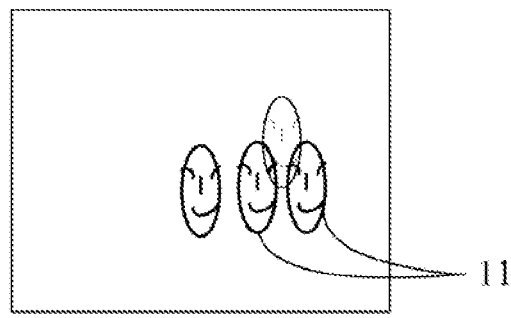
FIG. 2B is a second schematic view showing operations of the face recognition system.
Figure 2C:
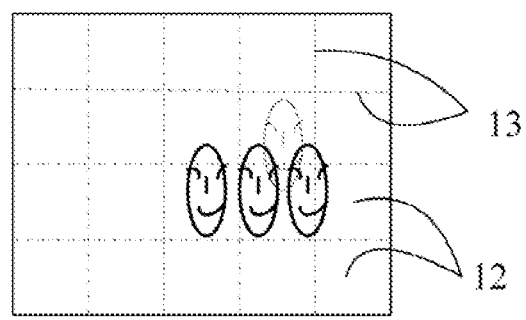
FIG. 2C is a third schematic view showing operations of the face recognition system.
Figure 2D:
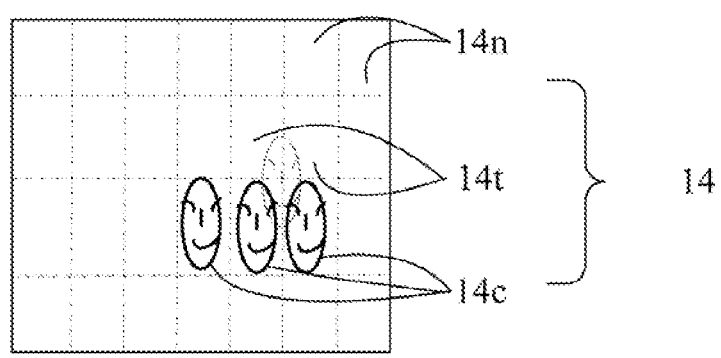
FIG. 2D is a fourth schematic view showing operations of the face recognition system.
Figure 2E:
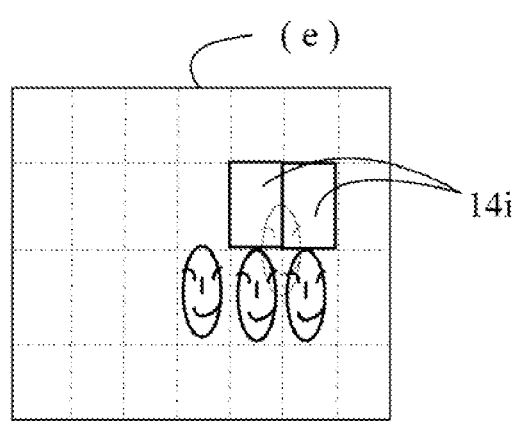
FIG. 2E is a fifth schematic view showing operations of the face recognition system.

The feature recognition module 500 is connected with the analysis module 400 and configured to recognize facial features such as skin color, eyes, nose, and mouth in each of the target blocks 14t and obtain a number of non-complete face blocks 14i, if any, each of which includes any of the facial features (see FIG. 2E). In this embodiment, non-complete face blocks 14i are obtained from the target blocks 14t.

The warning module 600 is connected to the feature recognition module 500 and configured to give out warnings when any non-complete face blocks 14i is obtained. For example, the warning module 600 can drive the image capturing device 1 to highlight the non-complete face blocks 14i and can make the non-complete blocks 14i flick as the warnings.

Figure 3:
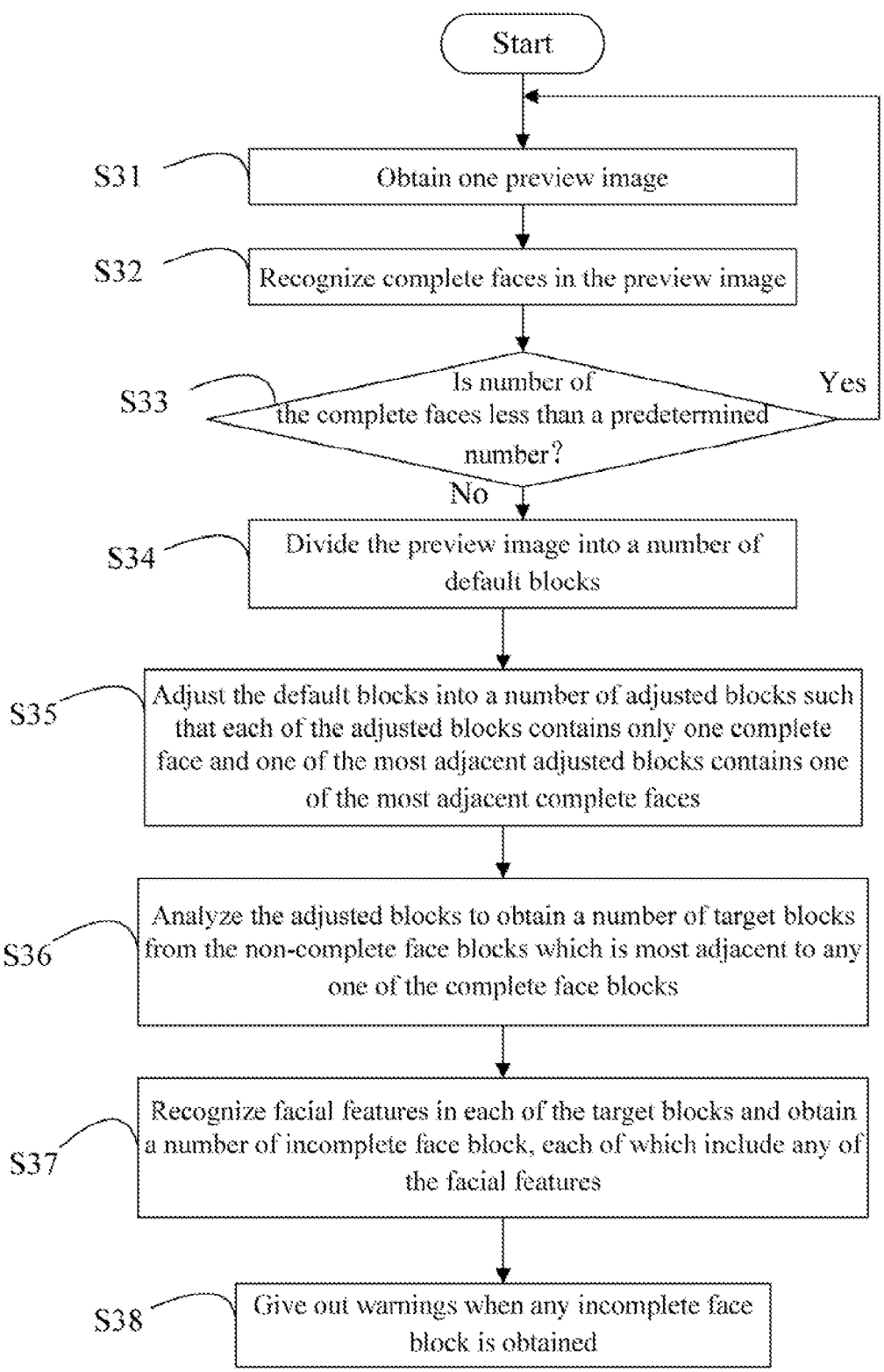
FIG. 3 is a flow chart of a face recognition method, according to an embodiment.

Referring to FIG. 3, a face recognition method, according to the embodiment, includes the following steps.

In step S31, the face recognition module 100 obtains one preview image.

In step S32, the face recognition module 100 recognizes complete faces in the preview image.

In step S33, the dividing module 200 determines whether the number of the complete faces is more than or equal to a predetermined number. If yes, the procedure goes to step S34, if no, the procedure goes back to step S31.

In step S34, the dividing module 200 divides the preview image into a number of default blocks 12.

In step S35, the block adjustment module 300 adjusts the default blocks 12 into a number of adjusted blocks 14. The adjusted blocks 14 are identical to each other and classified into a number of complete face blocks 14c and a number of non-complete face blocks 14n. Each of the complete face blocks 14c contains only one complete face 11 while each of the non-complete face blocks 14n does not contains any complete face 11. One of the most adjacent complete face blocks 14c contains one of the most adjacent complete faces 11.

In step S36, the analysis module 400 analyzes the adjusted blocks 14 to obtain a number of target blocks 14t from the non-complete face blocks 14n which is most adjacent to any one of the complete face blocks 14c.

In step S37, the feature recognition module 500 recognizes facial features such as skin color, eyes, nose, and mouth in each of the target blocks 14t and obtains a number of non-complete face blocks 14i, if any, each of which includes any of the facial features, from the target blocks 14t.

In step S38, the warning module 600 gives out warnings when any non-complete face blocks 14i is obtained.

Particular embodiments are shown here and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A face recognition method implemented on an image capturing device for taking group photos, comprising:
   obtaining one preview image;
   recognizing complete faces in the preview image;
   dividing the preview image into a plurality of default blocks if the number of the complete faces is more than or equal to a predetermined number;
   adjusting the default blocks into a plurality of adjusted blocks, the adjusted blocks comprising a number of complete face blocks and a number of non-complete face blocks, wherein each of the complete face blocks contains only one complete face while each of the non-complete face blocks does not contains any complete face, and one of the most adjacent complete face blocks contains one of the most adjacent complete face;
   analyzing the adjusted blocks to obtain a plurality of target blocks from the non-complete face blocks which is most adjacent to any one of the complete face blocks; and
   recognizing facial features in each of the target blocks and obtain a plurality of non-complete face blocks, each of which comprises any of the facial features.

2. The face recognition method according to claim 1, further comprising:
   giving out warnings when any non-complete face blocks are obtained.

3. The face recognition method according to claim 2, further comprising driving the image capturing device to highlight the non-complete face blocks as the warnings.

4. The face recognition method according to claim 2, further comprising:
   causing the non-complete blocks flicking as the warnings.

5. The face recognition method according to claim 1, further comprising:
   driving the image capturing device to highlight the complete faces.

6. The face recognition method according to claim 1, further comprising:
   driving the image capturing device to display a plurality of indicating lines to indicate boundaries of the default blocks.

7. The face recognition method according to claim 6, further comprising:
   updating the indicating lines according to the adjusted blocks.

8. The face recognition method according to claim 1, further comprising:
   calculating distance between the complete faces based upon recognition results of the face recognition module and thus determining a size, a shape, and positions of the adjusted blocks.

* * * * *